United States Patent
Mohanty et al.

(10) Patent No.: US 7,619,054 B2
(45) Date of Patent: Nov. 17, 2009

(54) DENDRIMER COMPOSITIONS WITH HIGH BRANCHING MULTIPLICITY

(75) Inventors: Dillip K Mohanty, Mt. Pleasant, MI (US); Zhong-Biao Zhang, Blacksburg, VA (US)

(73) Assignee: Central Michigan University Board of Trustees, Mt. Pleasant, MI (US)

( * ) Notice: Subject to any disclaimer, the term of this patent is extended or adjusted under 35 U.S.C. 154(b) by 519 days.

(21) Appl. No.: 11/365,903

(22) Filed: Mar. 1, 2006

(65) Prior Publication Data

US 2006/0264530 A1    Nov. 23, 2006

Related U.S. Application Data

(60) Provisional application No. 60/659,053, filed on Mar. 4, 2005.

(51) Int. Cl.
*C08G 63/52* (2006.01)
(52) U.S. Cl. ............... 528/306; 528/289; 528/363; 525/425; 525/437; 525/447; 977/754
(58) Field of Classification Search ........... 528/289, 528/293, 303, 306, 345; 525/437, 447, 425; 977/754

See application file for complete search history.

(56) References Cited

U.S. PATENT DOCUMENTS 5,530,092 A * 6/1996 Meijer et al. ............ 528/363
6,521,716 B1 * 2/2003 Leake .................... 525/421

* cited by examiner

*Primary Examiner*—Randy Gulakowski
*Assistant Examiner*—Michael Leonard
(74) *Attorney, Agent, or Firm*—Harness, Dickey & Pierce, P.L.C.

(57) ABSTRACT

Dendrimeric compounds and polymers are also provided wherein the dendrimer core is derived from the Michael reaction products. The branching pattern of the core and the multiplicity of the Michael addition lead to flexibility in designing and synthesizing dendrimeric materials.

The Michael addition products are from a reaction between primary amines and activated α,β-unsaturated compounds exemplified by diethyl methylenemalonate (DEMM). In various embodiments, the reaction proceeds with high yields in the absence of strong base or Lewis acid catalyst under mild reaction conditions. Depending on the state of steric hindrance in the amine, the reaction products are a double Michael addition product or a so-called vicarious Michael addition reaction product.

21 Claims, 3 Drawing Sheets

DENDRIMER COMPOSITIONS WITH HIGH BRANCHING MULTIPLICITY

CROSS-REFERENCE TO RELATED APPLICATIONS

This application claims the benefit of U.S. Provisional Application No. 60/659,053, filed on Mar. 4, 2005. The disclosure of the above application is incorporated herein by reference.

GOVERNMENT SUPPORT

The invention was developed in part from research supported by the Army Research Laboratory under Cooperative Agreement DADD19-03-2-0012. The U.S. Government may have certain rights in the invention.

INTRODUCTION

The present invention relates to an organic method of synthesis involving reaction of amines and $\alpha,\beta$-unsaturated compounds. The invention further relates to the use of the reaction products to make dendrimeric molecules.

The Michael addition reaction, discovered more than a century ago, is one of the most important organic reactions leading to the formation of carbon-carbon and carbon-heteroatom bonds. Although the Michael addition reaction was used to designate a conjugate adduct with a carbanion nucleophile, the term today encompasses conjugate adduct of a wide variety of nucleophile. The reacting components of a Michael addition reaction include an activated $\alpha,\beta$-unsaturated molecule (acceptor) and a nucleophile (donor). In most cases, strong bases (for deprotonation of the donor) or Lewis acid catalysts (for activation of the acceptor) are required to allow the reaction to proceed under mild conditions.

A critical reaction step in the first two commercial processes for the production of dendrimers (i.e. poly(amidoamine) (PAMAM) or poly(propyleneimine) (PPI) dendrimers) involves exhaustive, per-Michael addition of acrylates or acrylonitrile, respectively, to primary amine groups. It is this key reaction step that allowed amplification of terminal groups in the iterative divergent growth schemes to these quantized, nanoscale building blocks.

Dendrimers are precise, quantized macromolecules of keen interest to many scientific disciplines due to their unique dendritic/nanoscale properties. These features include; monodisperse nanoscale sizes, shapes and container properties, as well as persistent nanoscale scaffolding dimensions that present highly amplified terminal functional groups. These well-defined amplifications occur according to the mathematical expression; $Z=N_c N_b^G$, where Z is the number of terminal groups as a function of $N_c$ (core multiplicity), $N_b$ (branch cell multiplicity) and G (generation). Core and branch cell multiplicity values determine many of the above properties of dendrimers. (e.g., the generational onset of deGennes dense packing, interior void space for guest/host supramolecular chemistry, etc.). It is apparent that the ability to discretely introduce new geometric/amplification, structural parameters into the core, interior or terminal components of a dendrimer architecture should be of keen interest as a means for designing or creating new tunable dendritic properties.

SUMMARY

We report Michael addition products between primary amines and activated $\alpha,\beta$-unsaturated compounds exemplified by diethyl methylenemalonate (DEMM). In various embodiments, the reaction proceeds with high (nearly quantitative) yields in the absence of strong base or Lewis acid catalyst under mild reaction conditions. Depending on the state of steric hindrance in the amine, the reaction products are a double Michael addition product or a so-called vicarious Michael addition reaction product.

Dendrimeric compounds and polymers are also provided wherein the dendrimer core is derived from the Michael reaction products. The branching pattern of the core and the multiplicity of the Michael addition lead to flexibility in designing and synthesizing dendrimeric materials.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

DESCRIPTION

Figure 1:
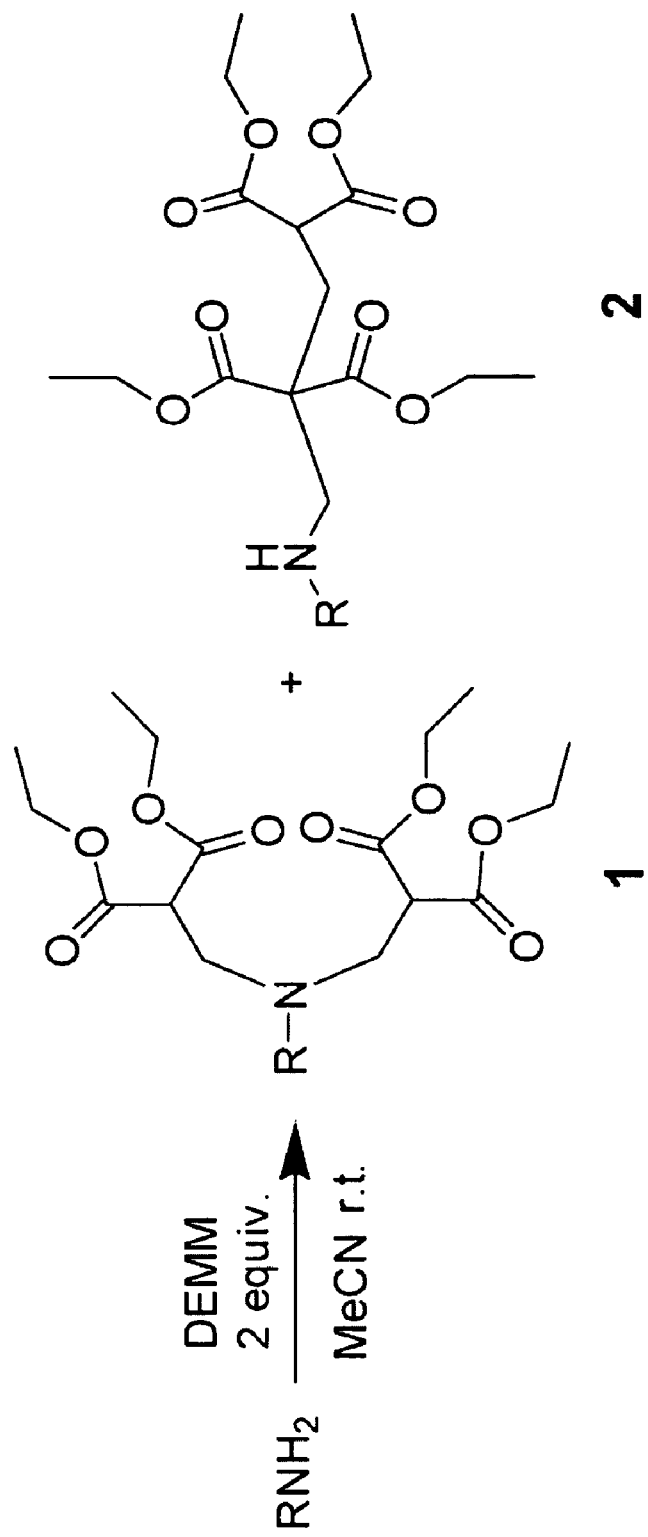
FIG. 1 illustrates a Michael reaction scheme.

In one embodiment, the invention provides a composition comprising the reaction product of an amine compound and an acceptor. The amine compound is ammonia or an organic primary amine having one or more —$NH_2$ (amino) groups. The amine is selected from the group consisting of aliphatic amines, alicyclic amines, aromatic amines and combinations thereof. The acceptor is an activated $\alpha,\beta$-unsaturated compound represented by the structure

(1)

where H is hydrogen and H' is hydrogen or a $C_{1-4}$ alkyl group that does not interfere unacceptably with the Michael addition. Preferably, H' is hydrogen.

The substituents X and Y on the acceptor are organic or inorganic substituents that contain a double bond disposed so as to be in conjugation with the double bond of structure I. Without limitation, X and Y are independently selected from the group consisting of —C(O)R, —$CO_2$R, —C(O)$NR^1R^2$, —P(O)($OR^1$)($OR^2$), —P(S)($OR^1$)($OR^2$), —$S(O_2)$R, —S(O)R, —$S(O_2)$(OR), —S(O)(OR), —CN, —$CF_3$, and —$NO_2$. The groups (except for —CN, —$CF_3$, and —$NO_2$) are illustrated below in the order given:

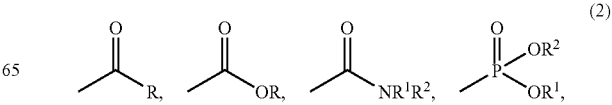

(2)

-continued

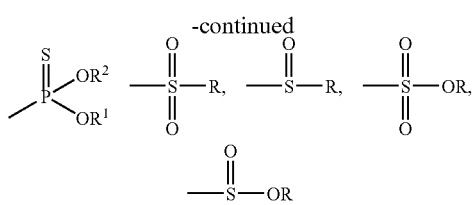

Alternatively, X and Y together form one of the groups

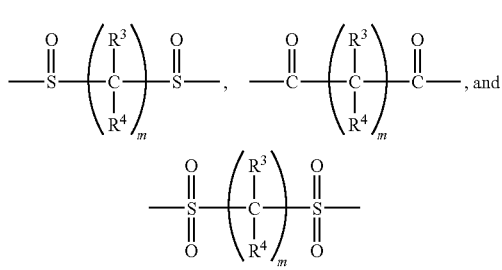

(3)

In the above, R, $R^1$, and $R^2$ are independently alkyl, aryl, or aralkyl groups of a size in number of carbon atoms that does not interfere unacceptably with the conjugate addition reaction. In various embodiments, R, $R^1$, and $R^2$ independently have 1-20 carbons, 1-12 carbons, and 1-8 carbons. In a preferred embodiment, they have 1-6 carbon atoms. Exemplary groups include methyl and ethyl groups. In similar fashion with the same considerations, $R^3$ and $R^4$ are cyclic, acyclic, aromatic, or aliphatic substituents. The value of m is 2 or 3.

In various embodiments, the amine is a monoamine containing a single —$NH_2$ group, a diamine comprising 2 —$NH_2$ groups, a triamine containing three amino groups, and so on. In one aspect, there is no particular limitation as to the number of amino groups—that is, the value of n in $A(NH_2)_n$— and it would be possible to run the reaction on polyamines with n up to 100 or even higher. For synthesizing core structures of dendrimeric compositions as discussed below, it is preferred to use polyamines having from 2 up to 8 amino groups.

In various embodiments, the reaction product is represented by the structure $AB_n$, wherein n is 1 or greater. In some embodiments, B is an amine moiety represented by the structure

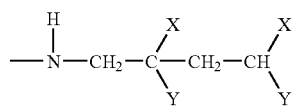

(4)

and A is an n-valent hydrocarbon radical comprising carbon atom attachment points for the moieties B. Depending on the structure of A, the amine moieties B are attached to a ring carbon or to a chain carbon atom having less than two hydrogen substituents. In both cases, the amine is said to be substituted at the alpha position adjacent to the attachment point of the moiety B, resulting in a "hindered amine" for the purposes of this description. In this embodiment, the substitution pattern of moieties B results from a so-called vicarious Michael additional reaction.

In other embodiments, the amine moiety B is represented by the structure

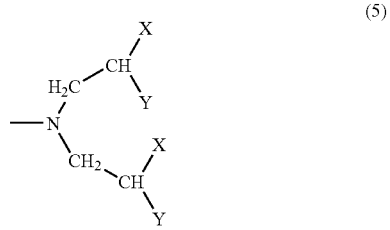

(5)

Reaction products having this structure are the result of double Michael addition to unhindered amines, including those that have no alpha substitutions. Unhindered amines with no alpha substitutions have two hydrogen substituents on the carbon atom attachment point of the amino group.

In another embodiment, the invention provides a conjugate reaction product of a primary amine $A$—$(NH_2)_n$ and an activated acceptor molecule represented by

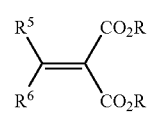

(6)

wherein A is an n-valent hydrocarbyl radical providing carbon atom points for the attachment for the amino groups $NH_2$ as discussed above. In the acceptor molecule, R is an aliphatic, aromatic, or alicyclic group of 1-20 carbon atoms. The groups $R^5$ and $R^6$ are selected from groups that do not interfere with the conjugate addition of the acceptor molecule and amine. For example, groups that would provide steric hindrance are to be avoided. In a preferred embodiment, at least one of $R^5$ and $R^6$ is hydrogen. Generally, $R^5$ and $R^6$ are independently selected from the group consisting of hydrogen and $C_{1-4}$ alkyl. In preferred embodiments, $R^5$ and $R^6$ are both hydrogen and R is a $C_{1-4}$ alkyl group. Depending on the configuration of the amine $A$—$(NH_2)_n$, the conjugated addition product is a double Michael addition product given by

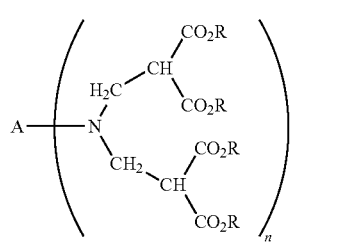

(7)

or a vicarious Michael addition product given by

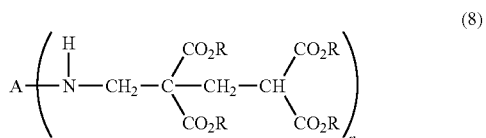

(8)

The methods of the invention provide a direct one step synthetic method for the preparation of compounds (7) and (8) in almost quantitative yields. In preferred embodiments, yields are greater than 80% and preferably greater than 90%.

In another embodiment, the invention provides a method for synthesizing conjugate addition products comprising reacting amino compounds A—$(NH_2)_n$ with acceptors as described above. The amino compound and acceptor molecules can be reacted preferably under mild conditions such as room temperature. A suitable solvent and concentration of reactants in the solvent is selected based on the solubility of the reactants, a desired reaction rate and yield, ease of isolation and purification, and other considerations. Polar solvents such as, without limitation, acetonitrile, are preferred. Catalysts may be added to the reaction mixture to activate the amine or the acceptor but are in general not required.

When the amine is a hindered amine as described above, the reaction product is given predominantly by the structure

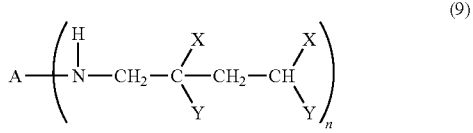

(9)

When the amine is unhindered as described above, the reaction product tends to be a double Michael addition product represented by

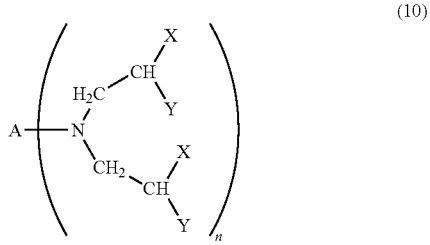

(10)

In preferred embodiments, X and Y are both —$CO_2R$. The methods provide direct one step preparation of compounds of structures (9) and (10) in almost quantitative yields under mild conditions. In various embodiments, the yields are above 80% and above 90%.

In another embodiment, the invention provides a dendrimer composition containing an initiator core derived from a conjugated addition product of an amino compound and an acceptor molecule as described above. The dendrimer composition further comprises interior layers or generations that contain repeating units radially attached to the initiator core, and an exterior of terminal functionality attached to the outermost generation of the dendrimer composition.

In various embodiments, the amino compound that reacts with the acceptor molecule to form the framework of the initiated core is represented by $\alpha(NH_2)_n$, where a is hydrogen or an imbalanced hydrocarbyl radical providing carbon atom points of attachment for the —$NH_2$ group of the amino compound. In preferred embodiments, X and Y are selected from the group consisting of —$CO_2R$ and —CN wherein R is $C_{1-6}$ alkyl.

In various embodiments, the repeating units of the interior generations are formed by reacting —$NH_2$ functional groups with the acceptor molecule in subsequent propagation steps.

In another embodiment, the invention provides a method for making a dendrimer composition comprising first synthesizing a dendrimer core by reacting an amino compound with an acceptor molecule, as described above, to form a first generation structure. Thereafter, the dendrimer core is reacted with a re-agent that converts the X and Y functional groups of the first generation structure into a group containing a primary amino group to form an amino intermediate. The amino intermediate is then reacted with an acceptor molecule, such as described above, to form a second generation structure comprising functional groups X and Y. Optionally, subsequent generations of the dendrimer composition are prepared by a reacting the second generation structure or other prior generation structures with a re-agent that reverts the X and Y functional groups into a group containing a primary amino group. The subsequent generation amino intermediate thus formed is available for reaction with suitable acceptor molecules to form subsequent generations.

In another embodiment, a method for synthesizing a dendrimer composition comprises reacting an amino compound containing one or more —$NH_2$ groups with an α,β-unsaturated acceptor molecule to form a first generation core. The core contains either 1 or 2 —N—$CH_2$— bonds and four ester functional groups per —$NH_2$ group of the amino compound. Subsequent generations of the dendrimer composition are formed by an iterative process. In the iterative process, first the ester functional groups are reacted with an α,ω-diamine to form an intermediate having amino functionality, and then the amino functional intermediate is reacted with an α,β-unsaturated acceptor molecule such as described above to form a next generation structure. As with the core, the next generation of structure contain four ester groups per amino group of the intermediate.

According to the invention, both aliphatic and aromatic amines undergo double addition of α,β-unsaturated compounds in high yields, preferably using a polar medium such as acetonitrile at room temperature. As noted, catalysis is not required for the reaction. Following the first N—H addition to the α,β-unsaturated acceptor molecule, the fate of the second Michael addition reaction is determined by the α-substituents on the amino compound. For unhindered amines (meaning aliphatic primary amines without substitutions at the α-position), the second N—H bond undergoes a Michael addition identical to the first one giving a reaction product with a branching structure like that of compound 1 of FIG. 1 (illustrated in the figure where the acceptor molecule is DEMM, X and Y are —$CO_2R$) as the sole product. For a cyclic primary amine or aliphatic amines with more than one non-hydrogen substitution at the α-position, the reaction provides a vicarious Michael addition to give a compound with a branching structure or pattern like that of compound 2 in FIG. 1 as the sole product.

Aromatic amines on the other hand tend to give a mixture of direct Michael addition product 1 and vicarious Michael addition product 2 at various mole ratios depending on the electronic nature of the substituents at para-positions. For example, aniline gives a 1:1, p-anisidine gives a 3:1, and p-nitroaniline gives a 1:9 ratio of structures 1:2 of FIG. 1. Although the invention is not limited by theory, it appears that steric hindrance at the α-position and the electron withdrawing effect in aromatic amine molecules facilitates a vicarious Michael addition to form products such as 2 in FIG. 1 by reducing the reactivity of the second N—H bond.

Suitable amines A—$(NH_2)_n$ for the reaction include monoamines, diamines, triamines, tetramines, and higher polyamines. Non-limiting examples include cyclohexyl amines, cyclohexane diamines, 1,2-ethanediamine, 1,4-butanediamine, and the like. The amines can be symmetric or non-symmetric. Ammonia can also be used as the amino compound of the invention. Suitable amines are primary, in that they contain one or more —NH$_2$ groups. As discussed above, the —NH$_2$ groups of the amino compounds of suitable starting materials can be attached to hydrocarbon radicals at a chain carbon or a ring carbon. Furthermore, the course of reaction depends in part on the substitution pattern of the alpha carbon to which the amino group is attached.

In various embodiments of the invention, the n-valent radical A is substituted at n carbon atom attachment points, as described above. In various embodiments, all of the carbon atom attachment points on A are the same, and are either all unhindered or all hindered, as described above. It is also to be understood that in various embodiments the attachment points provided by A are not all the same. Suitable amines A—(NH$_2$)$_n$ thus include those with a combination of hindered and unhindered attachment points for the amino groups. The reaction products, including dendrimer cores and dendrimer repeating units derived from the various Michael reactions reported here can thus have a combination of double Michael and vicarious Michael branching patterns.

Suitable α,β-unsaturated compound acceptor molecules include a variety of compounds containing constituents X and Y as described above. X and Y are chosen from among organic and inorganic substituents that contain a double bond to an oxygen or sulfur disposed in a manner to make an α,β-unsaturated compound, or that contain electron withdrawing groups that activate the olefin. Non-limiting examples of substituents X and Y include —C(O)R, —CO$_2$R, —C(O)NR$^1$R$^2$, —P(O)(OR$^1$)(OR$^2$), —P(S)(OR$^1$)(OR$^2$), —S(O$_2$)R, —S(O)R, —S(O$_2$)(OR), —S(O)(OR), —CN, —CF$_3$, and NO$_2$, wherein R, R$^1$, and R$^2$ are alkyl or aryl, preferably lower alkyl such as C$_1$ to C$_6$. Alternatively, X and Y together form one of the groups

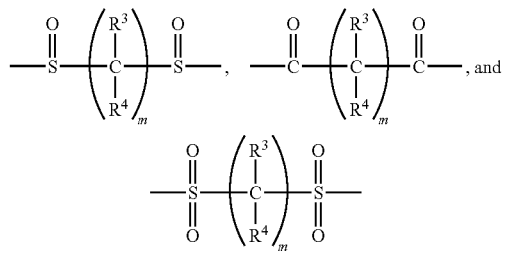

wherein R$^3$ and R$^4$ are cyclic, acyclic, aromatic or aliphatic substituents and n is 2 or 3. Preferably R$^3$ or R$^4$ are hydrogen or lower alkyl such as C$_1$ to C$_6$ alkyl.

Suitable acceptor molecules are commercially available from a variety of sources or can be prepared using known syntheses or a synthesis adapted from analogous structures. Preferred acceptor molecules include those wherein X and Y are ester groups —CO$_2$R or cyano groups —CN. Here R is any alkyl or other group giving the acceptors or reaction products suitable reactivity for further manipulations and further reactions. For convenience, R is preferably an alkyl group of 1 to 20 carbons, preferably 1 to 12 carbons, more preferably 1 to 8 carbons, and preferably 1 to 6 carbons. Diethyl methylenemalonate (DEMM) is an example of an acceptor wherein R is ethyl.

Further examples of acceptor molecules with the corresponding values of X and Y are give in the Table. The Table contains literature and patent reference to the synthesis of the acceptor molecules, all of which are hereby incorporated by reference.

| X | Y | References |
|---|---|---|
| C(O)(OMe) | C(O)(OMe) | Kunichika et al. Nippon Kagaku Kaishi 1972, 596. |
| C(O)Me | C(O)Me | Eastman Kodak Co. U.S. Pat. No. 2245567 (1939). |
| | | Borden Co. U.S. Pat. No. 3042710 (1962). |
| | | Trahanovsky; Mullen. J. Am. Chem. Soc. 1972, 94, 5086. |
| | | Gorenstein; Westheimer. J. Am. Chem. Soc. 1970, 92, 634. |
| NO$_2$ | NO$_2$ | Hamel, E. E. Tetrahedron Suppl. 1963, 4, 85–95. |
| CN | CN | Khalafallah, A. K.; Elal, R. M. Abd; Kanzi, N. A. A. El. Heterocycl. Commun. 2002, 8, 397. |
| | | Cowart, M.; Lee, C.-H.; Gfesser, G. A.; Bayburt, E. K.; Bhagwat, S. S.; Stewart, A. O.; Yu, H.; Kohlhaas, K. L.; McGaraughty, S.; Wismer, C. T.; Mikusa, J. et al. Bioorg. Med. Chem. Lett. 2001, 11, 83. |
| CF$_3$ | CF$_3$ | Misaki, S.; Takamatsu, S. J. Fluorine Chem. 1984, 24, 531. |
| | | Takamatsu, S.; Misaki, S. J. Fluorine Chem. 1982, 21, 74. |
| P(O)(OEt)$_2$ | P(O)(OEt)$_2$ | Nugent, R. A.; Murphy, M.; Schlachter, S. T.; Dunn, C. J.; Smith, R. J. et al. J. Med. Chem. 1993, 36, 134. |
| S(O)$_2$Et | S(O)$_2$Et | DuPont de Nemours & Co. U.S. Pat. No. 2641594 (1951). |
| S(O)$_2$Me | S(O)$_2$Me | Tetansheva, F. R. et al. J. Org. Chem. USSR (Engl. Transl.) 1978, 14, 442. Zh. Org. Khim. 1978, 14, 478. Hughes, S.; Griffiths, G.; Stirling, C. J. M. J. Chem. Soc. Perkin Trans 1987, 2, 1253. |
| S(O)$_2$(OH) | S(O)$_2$(OH) | Sokol'skii, G. A. et al. Bull. Acad. Sci. USSR Div. Chem. Sci. (Engl. Transl.) 1970, 574. Izv. Akad. Nauk SSSR Ser. Khim. 1970, 625. |

-continued

| X | Y | References |
|---|---|---|
| C(O)Me | C(O)(OEt) | Wuelfing. DE 80216 |
| $CF_3$ | C(O)(OMe) | Fuchikami, T.; Shibata, Y.; Suzuki, Y. Tetrahedron Lett. 1986, 27, 3173. |
| CN | C(O)(OMe) | Goodrich Co. U.S. Pat. No. 2467927, 2467926 (1947). Eastman Kodak Co. U.S. Pat. No. 2463677, 2721858, 2756251 (1954). |
| $NO_2$ | C(O)(OEt) | Wade, P. A.; Murry, J. K.; Shah-Patel, S.; Carroll, P. J. Tetrahedron Lett. 2002, 43, 2585. |
| C(O)(OEt) | $P(O)(OEt)_2$ | Levy, J. N.; McKenna, C. E. Phosphorus, Sulfur Silicon Relat. Elem. 1993, 85, 1. Venugopalan, B.; Hamlet, A. B.; Durst, T. Tetrahedron Lett. 1981, 22, 191. Martyres, D. H.; Baldwin, J. E.; Adington, R. M.; Lee, V.; Probert, M. R.; Watkin, D. J. Tetrahedron 2001, 57, 4999. |
| S(O)Me | S(O)Me | Ogura; Tsuchihashi. Bull. Chem. Soc. Jpn. 1972, 45, 2203. Louw; Nieuwenhuyse. Chem. Commun. 1968, 1561. |
| S(O)(OEt) | S(O)(OEt) | Ling-Chung, S.; Sales, K. D.; Utley, J. H. P. J. Chem. Soc. Chem. Commun. 1990, 9, 662. |
| $S(O)_2(OMe)$ | $S(O)_2(OMe)$ | Bauer; Jenkins. J. Am. Pharm. Assoc. 1937, 26, 486. |

Reaction of the amino compound and the α,β-unsaturated acceptor molecule forms reaction products with a distinctive substitution pattern or configuration of functional groups X and Y on a nitrogen containing compound. Specifically, the reaction products in general contain either 1 or 2 —N—$CH_2$— bonds and 4 functional groups X and Y for each —$NH_2$ group of the amino compound. The polyfunctionality and configuration of the functional groups lead to reaction products having a number of advantageous reactivity properties.

In one embodiment, the reaction products serve as the basis for the synthesis of dendrimers or dendrimeric compositions. Dendrimers and dendritic polymers are well known, and are described for example in Tomalia, et al., *Encyclopedia of Polymer Science and Engineering*, 2$^{nd}$ Edition, Index Volume, "Dendritic Polymers" (John Wiley & Sons, New York 1990), and in Frecht and Tomalia, *Dendrimers and Other Dendritic Polymers* (John Wiley and Sons, Chichester 2001), the disclosures of which are hereby incorporated by reference. In one aspect, dendrimers can be considered as the product of growth from a point of initiation. Dendrimers are formed in general by a span of linear growth followed by a branching event. After a branching event, linear growth continues for each branch until another branching event occurs, and the process repeats itself.

It is possible according to the invention to construct uniform dendritic branched compositions possessing so-called star burst topology. The multiplicity of the core $N_c$ and the branch multiplicity $N_b$ determines the number of surface groups present on the dendrimer as a function of generation.

In various embodiments, dendrimers of the invention possess an initiator core; interior layers or generations composed of repeating units radially attached to the initiator core; and an exterior or surface of terminal functionality attached to the outermost generation.

In various embodiments, the interior layers are composed of repeating units introduced by a sequence of stoichiometric chemical steps. The sequences are designed to leave a suitable terminal moiety that allows introduction of branched junctures with multiplicities $N_b$, as well as self-replication of the repeating unit in subsequent reiterative steps leading to higher generations.

In various embodiments, the terminal functional groups forming the surface or exterior of the dendrimers can be readily varied to give a wide variety of chemical and physical surface characteristics, ranging from nucleophilic to electrophilic and from hydrophilic to hydrophobic. Non-limiting examples include carbonyl, carboxyl, carbamide, isocyanate, methylol, carbamate, hydroxyl, carboxylic ester, sulfhydryl, cyano, silyl, siloxane, amino, alkylamino, ether, polyether, imidazole, mono and poly-nuclear aromatic moieties with or without substituents (nitro, amino, halogen, etc), cyclic ethers, acrylates with alkyl chains of various lengths and constitutions, fluorinated acrylates. organometallics (e.g. ferrocenes), carbohydrates, dyes, anti-cancer agents (e.g. Dauxorubicine, cis-platin), thioethers, fullerenes, cyclodextrins, heteroaromatics (pyrimidines, triazoles, benzimidazoles, benzothiazoles, benzoxazoles etc), diphenyl acetylenes, diphenyl sulfones, diphenyl sulfides, diphenyl ketones, triphenyl phosphine oxide, triphenyl phosphine sulfides, triphenyl arsenic oxides, crown ethers, rotaxanes, nitroso, quinones, ketimines, aldimines, carbon nanotubes, calixarenes, and substituted and unsubstituted trityl groups.

In one aspect, dendrimers of the invention are characterized by a branching multiplicity of four and an initiator core having a structure derived from the conjugated addition product of an α,β-unsaturated molecule and an amino compound as described above. When the amino compound is ammonia, the core is derived from a structure 11:

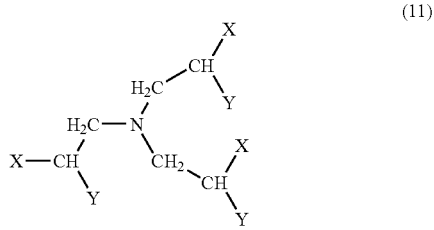

Where the amino compound is a primary amine having no α-substitution (that is, having two hydrogen substituents at the alpha position), the core is derived from a structure 12, resulting from Michael addition of two acceptor molecules per amino group, as described above:

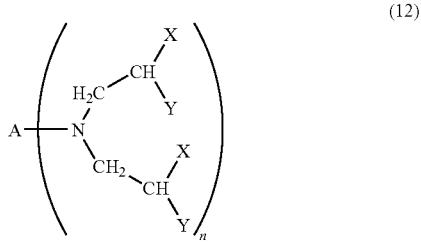

When the amine is an aliphatic primary amine with α-substitution or an alicyclic primary amine, the core is derived from structure 13:

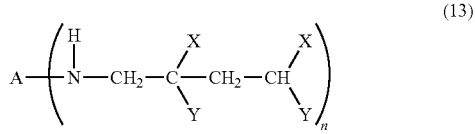

The structure 13 results from vicarious Michael addition of the acceptor molecule to the amino compound as described above.

When the amine is an aromatic primary amine, the core is derived from a mixture of structures 12 and 13, with the proportion of 13 increasing as the aromatic ring of the amino compound is substituted by groups that are more highly electron withdrawing than hydrogen.

In a preferred embodiment, functional groups X and Y in each generation are converted into amino functional groups that in turn provide a branching multiplicity of four in the next generation by double Michael and/or vicarious Michael addition to the acceptor molecule.

In one embodiment of the invention, a sequence of reaction steps is carried out to convert X and Y groups on first generation or subsequent generation structures to groups that contain an amino group —NH$_2$. Non-limiting examples of such a sequence of reaction steps include the amidation of an ester functional group X or Y by reaction with an α,ω-diamine to provide a aminoalkylamide functional group represented by —C(O)NH—CH$_2$—CH$_2$—NH$_2$ (illustrated for the case when the α,ω-diamine is ethanediamine). Non-limiting examples of suitable diamines include ethanediamine and 1,4-butanediamine. In another embodiment, when functional groups X and Y are cyano, the cyano functional group is reduced, for example with sodium borohydride, to form a methylamine group —CH$_2$—NH$_2$. The amino group on the methylamine group can then react with α,β-unsaturated acceptor molecules as described above to extend the dendrimer synthesis to subsequent generations.

It is seen that during dendrimer synthesis, the product $N_c$ (core multiplicity)×$N_b$ (branch multiplicity) gives the number of functional groups X and Y present at the surface of the growing dendrimer in each generation. At every generation, the product $N_c \times N_b$ becomes the core multiplicity for the subsequent generation. To illustrate, beginning with butane diamine ($N_c$=2) an initiator core can be synthesized by reacting with an acceptor molecule CH$_2$=C(X)(Y) ($N_b$=4) to form an 8-functional first generation product that in turn functions as a core with core multiplicity $N_c$=8 for the second generation.

In various embodiments, the first generation product serves as template for future generations. For example, Michael type addition reactions can be carried out on the functional groups after the functional groups X and Y are converted as noted above. Continuing with the illustration, the second generation would have a multiplicity of $N_c^1 N_b^2 = 8 \times 4 = 32$. Here, $N_c^1$ is the core multiplicity of the prior generation product. In similar fashion, a third generation can be made having the multiplicity of 32×4=128 which if desired can serve as a core for still further subsequent generations. It is seen that each generation has a successively larger number of groups X and Y (or groups derivable from X and Y) on the surface of the dendrimer composition. As is appreciated in the art, a point is generally reached where the dendrimeric molecule cannot grow further as a consequence of a lack of space on the surface. This point is generally a function of and/or limited by the core multiplicity and branching multiplicity of each generation as well as the branch length and the pattern of Michael addition for each generation.

As noted above, Michael addition of an α,β-unsaturated compound to an amino compound produces at least two different branching configurations having a multiplicity of four. When the amino compound is unhindered in that there are no substituents other than hydrogen attached to the α-carbon, the branching pattern is given by the double Michael addition product described above:

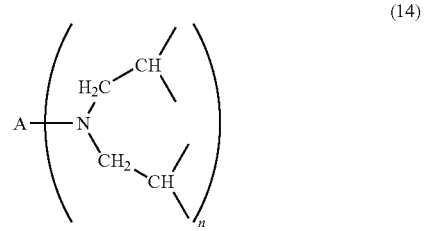

The double Michael addition product contains 2 —N—CH$_2$— bonds and four branching points derivable from functional groups X and Y per each amino group —NH$_2$ of the amino compound.

On the other hand, when the amine is an alicyclic amine, an aromatic amine, or an aliphatic amine having substitution at the α-position, the reaction tends to proceed by a vicarious Michael addition as described above, and the branching pattern is given by the following structure:

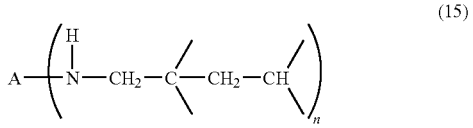

(15)

The vicarious Michael addition product contains a single —N—CH₂— bond and four branching points derivable from functional groups X and Y per each amino group —NH₂ of the amino compound.

In one embodiment, the Michael addition products of the invention are suitable for use as cores for dendrimeric compounds such as poly(amidoamine) (PAMAM) dendrimers. Using the X and Y functional acceptor molecules at the branch points provides a branching multiplicity of four, while keeping the ratio between the gyration radius and the number of surface terminal groups to a minimum. In various embodiments, this is advantageous as it leads to a high amplification of terminal surface groups at low generations. Depending on the dendrimer structure desired, this can lead to the reduction in the number of repeat synthesis steps that must be carried out, while still providing a high number of surface groups per molecule. Furthermore, double Michael addition and vicarious Michael addition provides a novel branching pattern, for example, having arms extended through variable distances from the core. Such a branching pattern is described above and illustrated in FIG. 1. The extension of the arms through variable distances from the core provides a new parameter to control the architecture of the resulting dendrimers.

The invention has been described above with respect to various preferred embodiments. Further non-limiting disclosure is given in the Examples that follow.

EXAMPLES

Example 1

| Example | R | Yields (%) | 1 (%) | 2 (%) |
|---|---|---|---|---|
| 1a | n-Pr | 92 | 100 | 0 |
| 1b | i-Pr | 95 | 0 | 100 |
| 1c | n-Bu | 90 | 100 | 0 |
| 1D | i-Bu | 95 | 100 | 0 |
| 1e | s-Bu | 97 | 0 | 100 |
| 1f | t-Bu | 98 | 0 | 100 |
| 1g | Cyclo-Hex | 97 | 0 | 100 |
| 1h | Ph | 99 | 50 | 50 |
| 1i | p-MeO-Ph | 98 | 75 | 25 |
| 1j | p-NO₂-Ph | 98 | 10 | 90 |

A serious of aliphatic and aromatic primary amines R—NH₂ is reacted with two equivalents of diethyl methylenemalonate in a polar medium such as acetonitrile at room temperature. The reaction is given in FIG. 1. The reaction product is analyzed to determine the percentage of direct double Michael addition (Structure 1) and vicarious Michael addition product (Structure 2). The structures are deduced from and consistent with nmr, ir, and elemental analysis. It is observed that following the first N—H addition to DEMM, the fate of the second Michael addition reaction is determined by the α-substituents on the amine substrate. For unhindered amines (meaning aliphatic primary amines without substitutions at the alpha position, that is having two hydrogens at the alpha position), the second N—H bond undergoes a Michael addition identical to the first one, giving compound 1 as the sole product. This is observed in the examples using n-propyl amine, n-butyl amine, and isobutyl amine. For a cyclic primary amine (cyclohexyl amine) or those with 1 or 2 methyl substituents at the α-position (isopropyl amine, sec-butylamine, and tert-butylamine), the C—H bond formed in the first step takes priority over N—H addition and undergoes a vicarious Michael addition to give compound 2 as the sole product. Aromatic amines give a mixture of direct Michael addition product 1 and vicarious Michael addition product 2 at various molar ratios depending on the electronic nature of the substituents at para-positions (1:2 ratios: aniline, 1:1; p-anisidine, 3:1; p-nitroaniline, 1:9). It is observed on the basis of Example 1 that steric hindrance at the alpha position and electron withdrawing effect in aromatic amine molecules facilitate vicarious Michael addition reaction by reducing the reactivity of the second N—H bond.

Example 2

This Example illustrates the reaction of diamines with α,β-unsaturated acceptor molecules at a molar ratio of 1:4 in room temperature in acetonitrile. 0.77 g cyclohexanediamine and 4.65 g DEMM are reacted in 100 mL acetonitrile. Reaction of 1,4-trans-cyclohexanediamine with DEMM at a molar ratio of 1:4 gives a vicarious Michael addition product represented by the structure

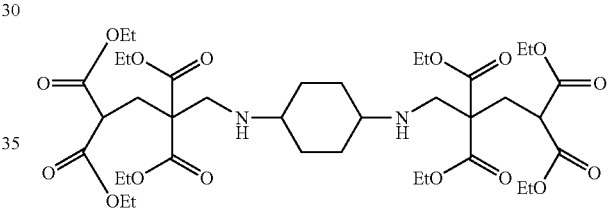

On the other hand, reaction of 1,4-butanediamine with DEMM at a molar ratio of 1:4 gives a direct Michael addition product represented by the structure

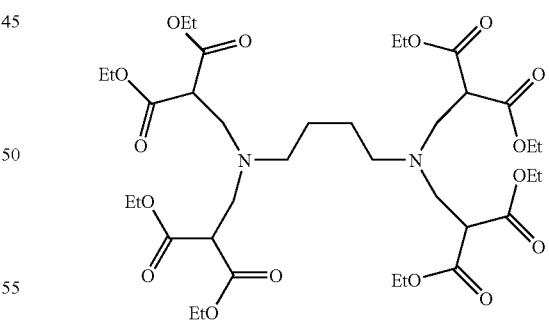

The structures are consistent with nmr, ir, and elemental analysis data.

Example 3

Figure 2:
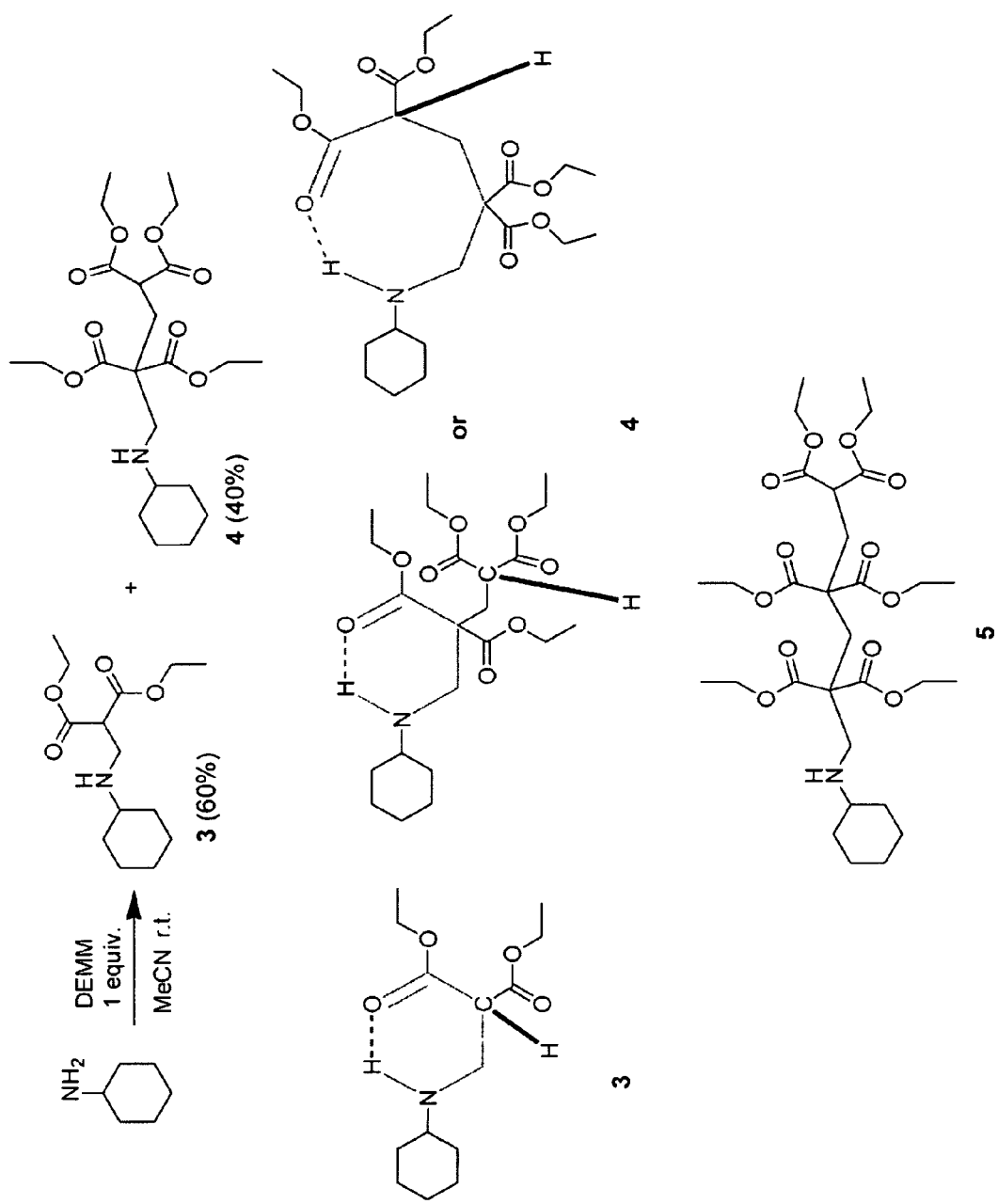
FIG. 2 illustrates another aspect of the Michael reaction scheme.

Cyclohexyl amine is allowed to react with DEMM at various molar ratios. The reaction scheme and results are illustrated in FIG. 2. The equimolar reaction of cyclohexylamine/DEMM results in the formation of a mixture of 1:1 and 1:2 adducts (compounds 3 and 4 in FIG. 2, respectively) in a molar ratio where 60% of the DEMM goes into structure 1 and 40% of the DEMM goes into structure 2. This result is obtained when cyclohexylamine is added in to an acetonitrile solution of DEMM. When DEMM is added into an amine solution, the content of the 1:2 adduct is slightly reduced with 70% of the DEMM going into structure 3 and 30% into structure 4. In both cases, the reaction mixture also contains starting material cyclohexylamine. When an additional equivalent of DEMM is added into the reaction mixture, vicarious Michael addition adduct 4 is isolated as the sole product. Further addition of DEMM is not observed when another equivalent of DEM is added to the reaction mixture. That is, structure 5 of FIG. 2 is not formed. This confirms the higher reactivity of the highlighted C—H bond in 3 than in 4 towards another Michael addition reaction.

FIG. 2 also illustrates hydrogen bonding in the reaction products that can account for the observed reactivity differences between the various C—H bonds in the reaction intermediate. It is seen that the extent of hydrogen bonding is dependent on the size of the ring and the through-space distances. As illustrated in FIG. 2 the C—H bond in label 3 is more labile than that in 4.

Example 4

Figure 3:
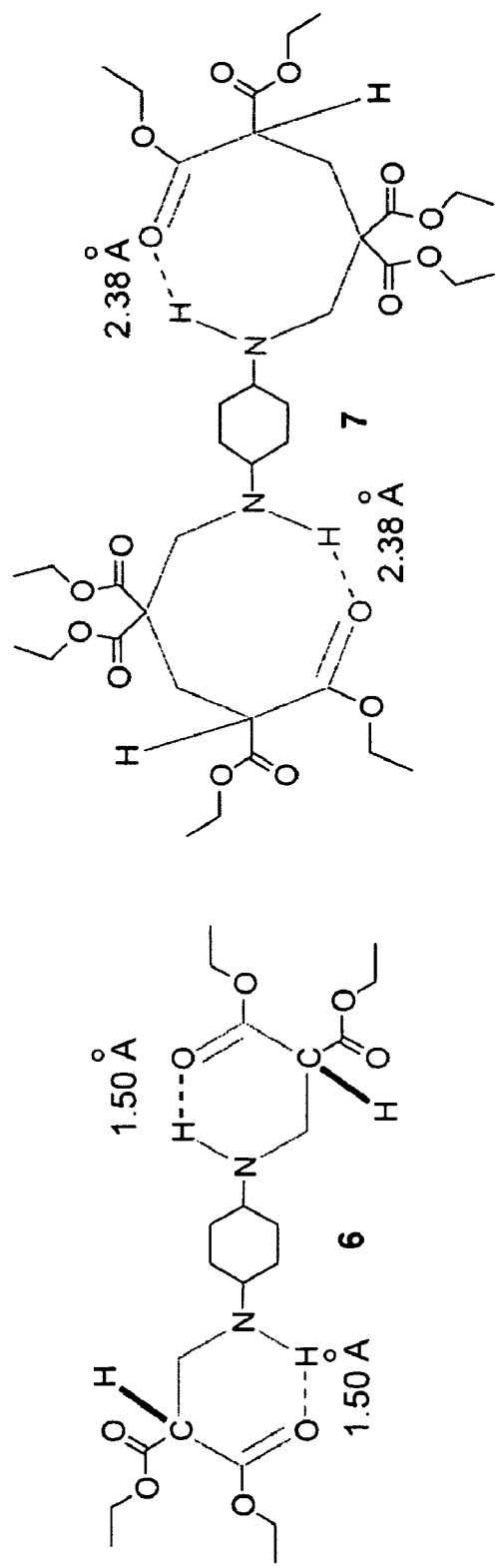
FIG. 3 illustrates the structure of reaction products.

Single crystal X-ray diffraction analysis results of compound 7 (FIG. 3) indicate the existence of weak hydrogen bonding with a bond length of 2.38 Å between the hydrogen of the N—H bond and the oxygen of the carbonyl from the second DEMM molecule through an eight-membered ring.

A theoretical calculation using molecular mechanics methods on compound 6 (representing an "intermediate" formed after the first equivalent of DEMM adds) indicates the existence of strong hydrogen bonding with a bond length of 1.5 Å between the hydrogen of the N—H bond and the oxygen of the carbonyl through a six-membered ring. The results are consistent with the observed differences in reactivity in C—H bonds in compounds 3 and 4 of Example 3.

Although the invention has been described above with respect to various preferred embodiments, it is to be understood that the invention is not limited to the embodiments disclosed. The description is merely exemplary in nature and, thus, variations that do not depart from the gist of the invention are intended to be within the scope of the invention. Variations and modifications such as will occur to the person of skill in the art upon reading the description are also included within the scope of the invention, which is defined in the appended claims.

We claim:

1. A dendrimer comprising:
an initiator core derived from a conjugate addition product of an amino compound and an acceptor molecule;
interior generations comprising repeating units radially attached to the initiator core; and
an exterior of terminal functionality attached to the outermost generation, wherein the amino compound is ammonia or a compound represented by $A-(NH_2)_n$ wherein n is 2 to 8 and A is an n-valent hydrocarbyl radical providing carbon atom points of attachment for the $-NH_2$ groups of the amino compound, and
the acceptor molecule is an activated $\alpha,\beta$-unsaturated compound

wherein X and Y are independently selected from the group consisting of $C(O)R$, $-CO_2R$, $-C(O)NR^1R^2$, $-P(O)(OR^1)(OR^2)$, $-P(S)(OR^1)(OR^2)$, $-S(O_2)R$, $-S(O)R$, $-S(O_2)(OR)$, $-S(O)(OR)$, $-CN$, $-CF_3$, and $NO_2$
or X and Y together form a group selected from the group consisting of:

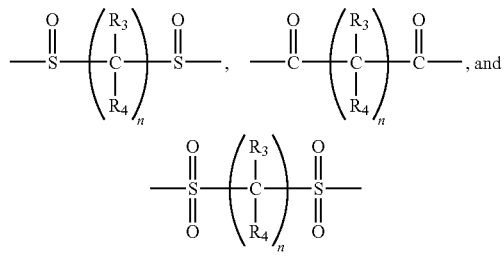

wherein R, $R^1$, and $R^2$ are alkyl or aryl having 1 to 20 carbon atoms, and $R^3$ and $R^4$ are independently hydrogen or cyclic, acyclic, aromatic or aliphatic substituents with 1-10 carbon atoms, and n is 2 or 3.

2. A composition according to claim 1, wherein X and Y are $-CO_2R$ wherein R is $C_{1-6}$ alkyl.

3. A composition according to claim 1, wherein X and Y are $-CN$.

4. A composition according to claim 1, wherein the repeating units of the interior generations are formed by reacting $-NH_2$ functional group with the acceptor molecule.

5. A composition according to claim 1, wherein the amino compound is an aliphatic amine with less than two hydrogen substituents at the alpha position or is an alicyclic amine, and the core has a branching configuration of

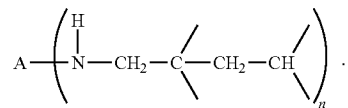

6. A composition according to claim 1, wherein the amino compound is an aliphatic amine with two hydrogen substituents at the alpha position, and the core has a branching configuration of

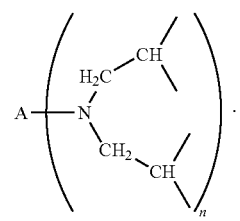

7. A method of synthesizing a dendrimer composition comprising
   a) synthesizing a dendrimer core by reacting an amino compound with an acceptor molecule to form a first generation structure comprising X and Y functional groups;
   b) reacting the dendrimer core with a re-agent that converts the X and Y functional groups into a group containing a primary amino group to form an amino intermediate;
   c) reacting the amino intermediate with an acceptor molecule to form a second generation structure comprising X and Y; and
   d) optionally preparing subsequent generations by reacting the prior generation structure with a reagent that converts the X and Y into a group containing the primary amino group to form a subsequent generation amino intermediate,
wherein the amino compound is a primary monoamine or primary polyamine selected from the group consisting of ammonia, aliphatic amines, alicyclic amines and aromatic amines; and
the acceptor molecule is an activated α,β-unsaturated compound

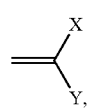

(I)

wherein X and Y are independently selected from the group consisting of —C(O)R, —CO$_2$R, —C(O)NR$^1$R$^2$, —P(O)(OR$^1$)(OR$^2$), —P(S)(OR$^1$)(OR$^2$), —S(O$_2$)R, —S(O)R, —S(O$_2$)(OR), —S(O)(OR), —CN, —CF$_3$, and NO$_2$ or X and Y together form a group selected from the group consisting of:

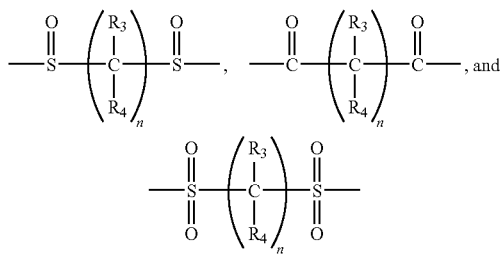

wherein R, R$^1$, and R$^2$ are alkyl or aryl having 1 to 20 carbon atoms, and R$^3$ and R$^4$ are independently hydrogen or cyclic, acyclic, aromatic or aliphatic substituents with 1-10 carbon atoms, and n is 2 or 3.

8. A method according to claim 7, wherein X and Y are —CO$_2$R.

9. A method according to claim 7, wherein X and Y are —CN.

10. A method according to claim 7, wherein X and Y and —CO$_2$R and the reagent in step b) is an α,ω-diamine.

11. A method according to claim 7, wherein the amino compound is A—(NH$_2$)$_n$ wherein n is from 1 to 4 and A is an n-valent hydrocarbyl radical providing carbon atom points of attachment for the amino groups —NH$_2$, wherein at least one of the amino groups is attached to an aliphatic chain atom with less than two hydrogen substituents or to an alicyclic ring carbon.

12. A method according to claim 11, wherein n is 2.

13. A method according to claim 11, wherein the dendrimer core comprises at least one group

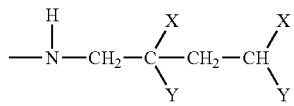

that is attached to the radical A.

14. A method according to claim 7, wherein the amino compound is A—(NH$_2$)$_n$ wherein n is from 1 to 4 and A is an n-valent hydrocarbyl radical providing carbon atom points of attachment for the amino groups —NH$_2$, wherein at least one of the amino groups is attached to an aliphatic carbon atom with two hydrogen substituents.

15. A method according to claim 14, wherein n is 2.

16. A method according to claim 14, wherein the dendrimer core comprises at least one group

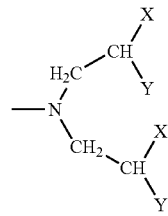

that is attached to the radical A.

17. A method for synthesizing a dendrimer comprising
   reacting an amino compound comprising one or more —NH$_2$ groups with an α,β-unsaturated acceptor molecule to form a first generation core comprising, per —NH$_2$ group of the amino compound, either one or two —N—CH$_2$— bonds and four ester functional groups —CO$_2$R,
wherein R is C$_{1-6}$ alkyl; and
   forming the subsequent generations by an iterative process comprising;
   a) reacting the ester functional groups with an α,ω-diamine to form an intermediate having amino functionality; and
   b) reacting the amino functional intermediate with an α,β-unsaturated acceptor molecule to form a next generation structure comprising four ester groups per amino group of the intermediate.

18. A method according to claim 17, wherein the acceptor molecule is

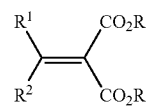

wherein R$^1$ and R$^2$ are independently selected from the group consisting of hydrogen and C$_{1-4}$ alkyl, and at least one of R$^1$ and R$^2$ is hydrogen.

19. A method according to claim 17, wherein the acceptor molecule is diethylmethylenemalonate.

20. A method according to claim 17, wherein the α,ω-diamine is 1,4-butanediamine.

21. A method according to claim 17, wherein the amino compound has 2 or more amino groups.

* * * * *